O. A. MYGATT.
ILLUMINATING APPLIANCE.
APPLICATION FILED JUNE 11, 1912.
1,178,537.
Patented Apr. 11, 1916.
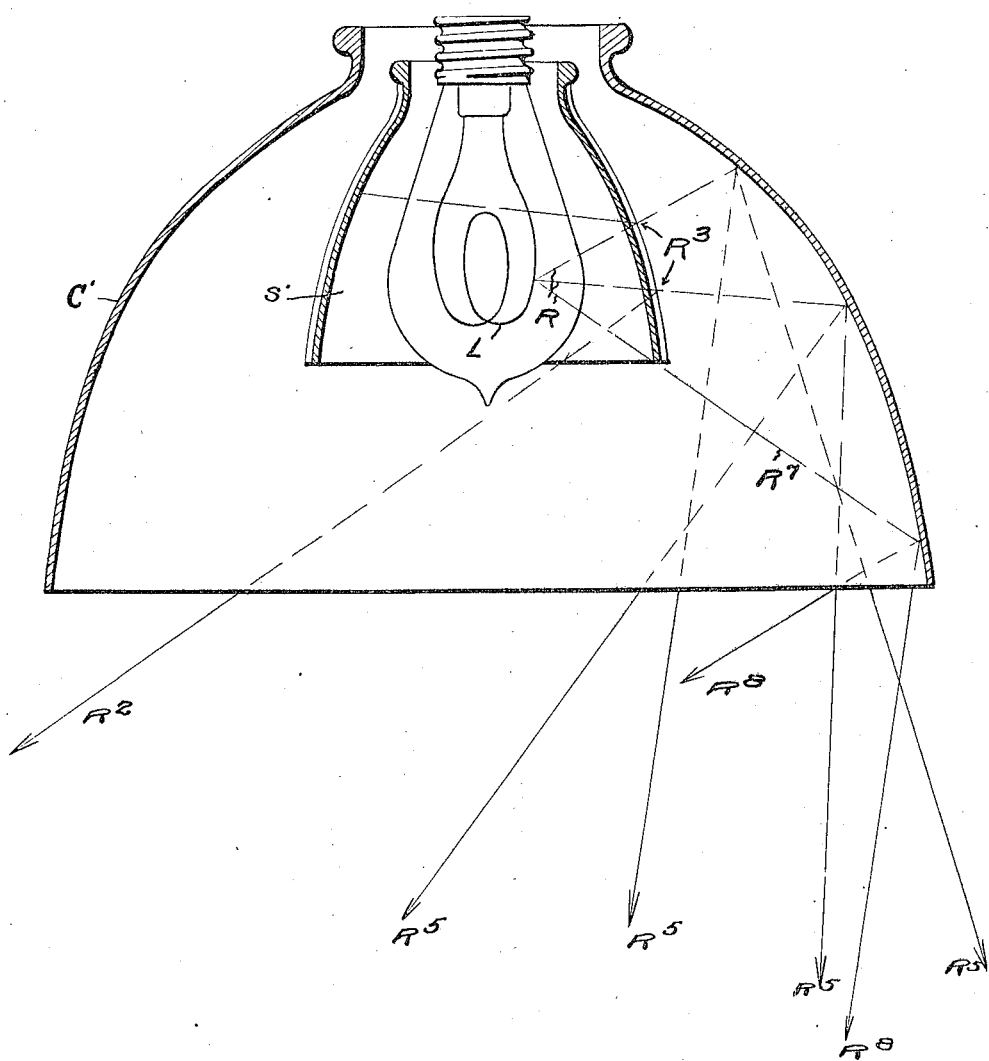
WITNESSES
INVENTOR

UNITED STATES PATENT OFFICE.

OTIS A. MYGATT, OF NEW YORK, N. Y., ASSIGNOR TO HOLOPHANE GLASS COMPANY, OF NEW YORK, N. Y., A CORPORATION OF NEW JERSEY.

ILLUMINATING APPLIANCE.

1,178,537.  Specification of Letters Patent.  Patented Apr. 11, 1916.

Original application filed April 25, 1907, Serial No. 370,201. Divided and this application filed June 11, 1912. Serial No. 703,098.

*To all whom it may concern:*

Be it known that I, OTIS A. MYGATT, a citizen of the United States, and a resident of the city of New York, in the county of New York and State of New York, have invented a certain new and useful Illuminating Appliance, of which the following is a specification.

My invention relates to illuminating appliances, and its object is to provide in an appliance which constitutes an operative unit, means for regulating the quantity, distribution, and also the quality of light rays reflected from a source of artificial light.

This application is a division of application No. 370,201, filed April 25, 1907.

I obtain this result by using a reflecting appliance in which specular reflecting surfaces are combined with light-radiating reflecting surfaces, arranged in various ways, and relationships.

Reflectors in general use at the present time may be classified as (1) specular reflectors, of which prism glass is an example, and (2) light radiating or diffusing reflectors (which reflect chiefly because of their color properties), of which opal glass is an example.

Hereinafter, for the sake of brevity, reflectors or reflecting surfaces of the first class will in some cases be called specular, and those of the second class, colored. Certain quantities of each of these classes of reflectors, and certain disadvantages of each, which my invention obviates, will now be briefly pointed out: Light rays are reflected by specular reflectors in definite directions, and these reflectors may be constructed to give almost any desired light distribution, within reasonable limits. The reflective results are due in part to the shape of the reflector body and in part to the conformation of the reflecting surfaces themselves (for example, the prismatic surfaces of prismatic glass reflectors). Light rays directed by specular surfaces are, however, comparatively harsh, and in practice there is frequently an undersirably sudden variation in the outline of the theoretically correct curve of distribution, the causes of which are well understood by those versed in the art, and need not be particularly referred to here. When the specular reflector consists of prism glass a certain amount of light passes through the reflector and the amount of light thus passing upwardly is frequently greater than is desirable for proper illumination of ceilings.

In color reflectors the quantity of light reflected depends mainly on the color of the reflecting material, and upon the surface finish of such material. Light rays reflected by these reflectors are not sharp and definite as when reflected from a specular surface, but are more or less blended, diffused and softened. These reflectors have little or no ability to concentrate, distribute or control the direction of light rays which they reflect.

By combining in a single structure specular and colored reflecting mediums I combine the advantages and eliminate the disadvantages of the distinct forms described. By this means I am enabled to produce a single reflecting appliance which distributes light definitely according to a predetermined plan and also radiates or diffuses a portion of the light rays, these diffused rays mingling with those reflected by the specular surfaces so that the combined reflected light is softened and at the same time distributed in the desired manner.

The reflectors may be made of other material than glass, and the reflecting surfaces may widely vary, but I have found that my invention may be embodied in prism glass combined with "opal" glass to better advantage than in any other form. As a specific illustration of the invention I have accordingly shown this form in the drawing.

The figure is a cross section of an appliance embodying my invention.

In the figure is shown an arrangement consisting of a light source such as an incandescent light filament L, an inner prism glass reflector S' and an outer opal or otherwise colored reflector C'. The inner reflector is the specular member and the outer reflector the non-specular member. The principal part of light rays R falling upon the inner surface of reflector S' strike the prisms and are reflected back and from the mouth of the reflector, as indicated by portion $R^2$ in the usual manner. A part of the rays, however, pass through the specular body as at $R^3$, and encountering the colored outer reflector C' are broken up and radiated downwardly between the two reflectors, as indicated at R⁵, in a diffused and softened condition. Rays R⁷ pass below reflector S' and encounter only the colored reflector C', and are reflected in diffused rays R⁸ to mingle with other light rays.

In the foregoing detailed description prism glass has been described as constituting the specular member, and opalized glass the colored member. Instead of these particular forms and materials, however, widely different devices may be substituted.

While white or opalescent tints probably give the best results as non-specular reflecting mediums, other colors and tints possess the same properties to a varying degree, and the glass or other reflector body may therefore, if desired, be given other than white or opalescent tints to produce the light-diffusing reflecting member.

For the purpose of describing this invention, the illuminating appliance has been illustrated in a pendant position, but it is not limited to the pendant position, and can be used in an upright or any other position.

What I claim is:

1. In a light modifying appliance, an outer diffusing reflector and an inner specular reflector, the latter being spaced apart from the diffusing reflector and comprising means for transmitting light uniformly over the inner surface of said diffusing reflector.

2. In a light modifying appliance, an open-mouthed outer diffusing reflector and an open-mouthed inner specular reflector spaced apart from the diffusing reflector and directing light uniformly over the inner surface of the diffusing reflector.

3. In a light modifying appliance, an outer open-mouthed diffusing reflector, an inner specular reflector spaced apart from the diffusing reflector reflecting a majority of the light rays through and out of its open mouth, the said specular reflector comprising means for transmitting the remainder of the light rays uniformly over the inner surface of the said diffusing reflector.

4. A light modifying appliance comprising an outer diffusing reflector and an inner open-mouthed prismatic reflector spaced apart from the diffusing reflector.

OTIS A. MYGATT.

Witnesses:
 JNO. B. LIBERMAN,
 LUCIEN MEMMINGER